Aug. 24, 1954 H. EBERT 2,687,049
AXIAL PISTON FLUID TRANSMISSION
Filed Dec. 11, 1951 6 Sheets-Sheet 1

INVENTOR
Heinrich Ebert

BY
Patent Agent.

Aug. 24, 1954 H. EBERT 2,687,049
AXIAL PISTON FLUID TRANSMISSION
Filed Dec. 11, 1951 6 Sheets-Sheet 2

INVENTOR
Heinrich Ebert
BY
Patent Agent.

Aug. 24, 1954     H. EBERT     2,687,049
AXIAL PISTON FLUID TRANSMISSION
Filed Dec. 11, 1951     6 Sheets-Sheet 4

INVENTOR
Heinrich Ebert
BY
Patent Agent

INVENTOR
Heinrich Ebert
BY
Patent Agent.

Patented Aug. 24, 1954

UNITED STATES PATENT OFFICE 2,687,049

AXIAL PISTON FLUID TRANSMISSION

Heinrich Ebert, Furth, Germany

Application December 11, 1951, Serial No. 261,101

Claims priority, application Germany
December 14, 1950

8 Claims. (Cl. 74—687)

The present invention relates to fluid transmissions and, more particularly, to axial piston fluid transmissions of the single acting or double acting type, in which the swash plates of the primary part and the swash plates of the secondary part act together on the output shaft.

With transmissions of this type as heretofore known, the output shaft is constructed as an ordinary shaft which has arranged around the outside thereof the fixed or turnable swash plates with their bearings as well as the cylinder bodies for the axial pistons. Such an arrangement, however, is not suitable for larger transmissions and outputs in as much as the swivel bearings for the swash plates cannot any longer be accommodated properly in view of their necessarily increased size. Furthermore, with transmissions, in which the primary cylinder body as well as the secondary cylinder body are to be driven by means of gears at different speeds, the tooth velocities become too great, particularly when transmissions are involved which have a great speed reduction ratio.

It is, therefore, an object of this invention to provide an axial piston fluid transmission which will overcome the above mentioned drawbacks.

It is another object of this invention to provide an axial piston fluid transmission, the output shaft of which is so constructed that the fixed or turnable swash plates, the cylinder bodies pertaining thereto, and the respective driving or arresting shafts can easily be accommodated in their respective desired size.

It is a further object of this invention to provide an axial piston fluid transmission of the above type which will bring about a more favorable load distribution for the swivel bearings and allow accommodation of these bearings in the desired size without affecting the size of the swash plates or the desired dimensions thereof.

It is still another object to provide an axial piston fluid transmission having its primary cylinder body rotated at a speed different from the speed of rotation of the secondary cylinder body, in which the gears of the drive shaft or shafts may be kept correspondingly small so that also the tooth velocities of the driving gears may be kept within correspondingly low limits.

A still further object of this invention consists in the provision of an axial piston fluid transmission with a primary and a secondary cylinder body and a rotatable control valve, in which both cylinder bodies may be pre-loaded by a single pressure spring to thereby make sure that the cylinder bodies are sealed with regard to the control valve before the self-sealing effect is reached which latter is produced at higher pressures.

These and other objects and advantages of the invention will appear more clearly from the following specification in connection with the accompanying drawings in which.

General arrangement

In order to overcome the above mentioned drawbacks encountered with the heretofore known axial piston fluid transmissions with regard to the accommodation of properly dimensioned swivel bearings for the swash plates and tooth velocities of the driving gears, according to the present invention the output shaft is constructed as a hollow shaft in the interior of which are mounted the fixed or turnable swash plates as well as the cylinder bodies pertaining thereto and their driving or arresting shafts. In this way, the swivel bearings for the swash plates receive a more favorable load, and these swivel bearings can easily in the desired size and with the necessary dimensions be accommodated within the hollow output shaft without affecting the size of the swash plates.

With transmissions in which the primary as well as the secondary cylinder body is driven at correspondingly different speeds, the gears on the drive shafts can be kept correspondingly small so that also the tooth velocities of the driving gears can be kept within correspondingly low limits.

A further feature of the invention consists in arranging a planetary gear system coaxially with the drive shaft and the cylinder bodies while the sun wheel is for instance connected to the drive shaft for the primary cylinder body, and the planet carrier is rigidly connected to the drive shaft for the secondary cylinder body.

When in the arrangement according to the present invention a rotatable control valve is used for controlling the fluid supply to and the fluid discharge from the cylinder bodies, a single pressure spring may be used according to the present invention for pre-loading both cylinder bodies to thereby assure the sealing of the cylinder bodies with regard to the rotatable control valve before the self-sealing becomes effective at higher pressures in view of the formation of the cylinder bores.

Structural arrangement

Figure 1:
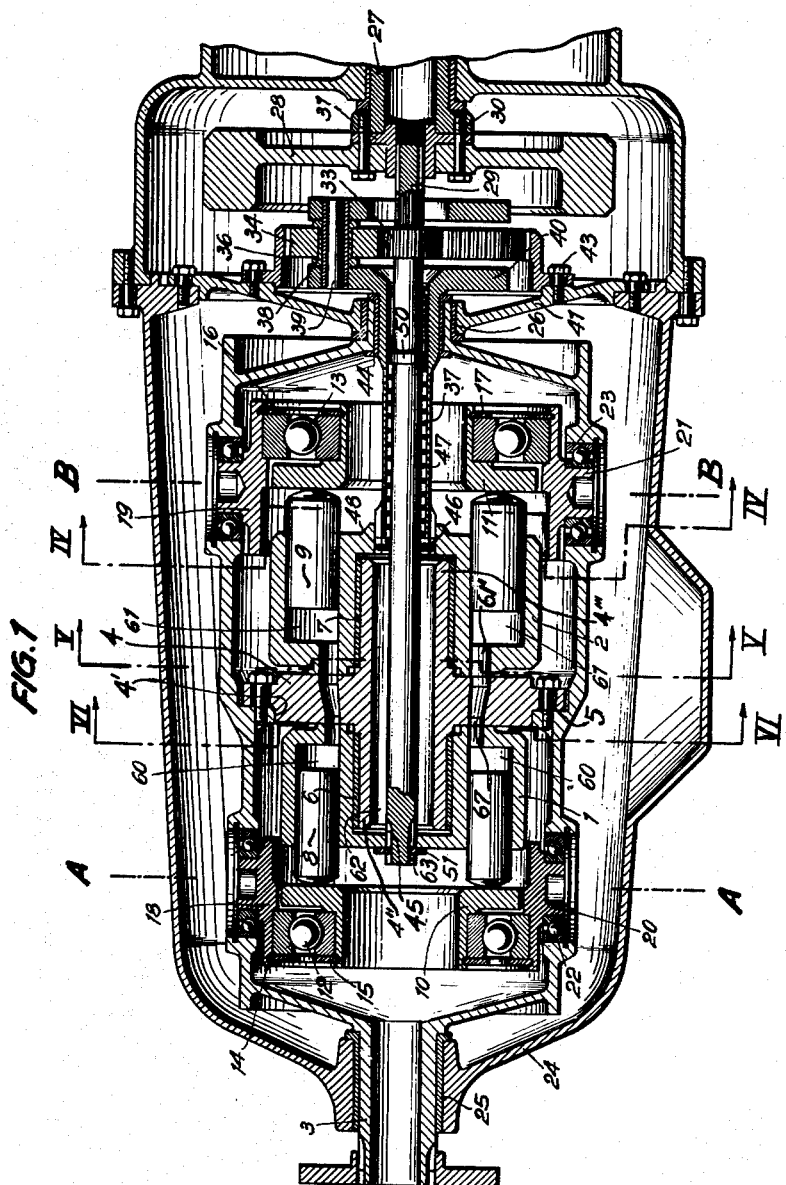
Fig. 1 represents a longitudinal section through an axial piston fluid transmission in which both the primary and the secondary cylinder body is rotated.

Referring now to the drawings in detail and Fig. 1 thereof in particular, the structure shown therein comprises a primary cylinder body or primary rotor 1 and a secondary cylinder body or secondary rotor 2. The rotors 1 and 2 are mounted in the interior of the hollow shaft 3 which represents the output shaft. As will be clear from the drawing, a rotatable control valve 4 is arranged in the interior of the output shaft 3 and is connected thereto by screws 5. The annular surface 4' of the output shaft 3 engages a corresponding annular surface of the control valve 4 so as properly to center the valve 4. The control valve 4 has two arms 4'' and 4''' on which are rotatably mounted the rotors 1 and 2 respectively, said rotors having connected thereto in any convenient manner bushings 6 and 7 respectively. Each of the rotors 1 and 2 has respectively provided therein cylinders 60, 61 in which are reciprocably arranged pistons 8 and 9 respectively actuating the swash plates 10 and 11. These swash plates are supported by ball bearings 12 and 13 so as to be rotatable about the longitudinal axis of the drive shaft 29. The ball bearings 12 and 13 are maintained in their positions by the snap rings 14, 15 and 16, 17. The ball bearings 12, 13 have their outer races mounted in swivel bearings 18 and 19, the studs 20 and 21 of which are rotatably mounted in the ball bearings 22 and 23 so as to allow turning of the swivel bearings 18 and 19 about the axes A—A and B—B respectively. As will be clear from the drawing, the ball bearings 22 and 23 are mounted in or supported by the hollow output shaft 3. Depending on the positioning of the swivel bearings 18 and 19 in the well known manner, the two cylinder bodies or rotors 1 and 2 act together upon the output shaft 3 and, as will be explained later, rotate shaft 3 at corresponding speeds in its bearings 25 and 26, which bearings are mounted in the transmission casing 24.

The primary and secondary cylinder bodies 1 and 2 are driven by the motor shaft 27 with flywheel 28 through the intervention of a splined intermediate member 31 which is connected to the flywheel 28 by screws 30. While the primary cylinder body 1 is rotated directly by the drive shaft 29 extending through bore 62 of the control valve 4, the secondary cylinder body 2 is rotated at the required speed, in this instance at a low speed, by shaft 29 through the intervention of a planetary gear system comprising wheels 33, 34 and 36 and the hollow shaft 37. The sun wheel 33 is rigidly connected to the drive shaft 29, while the planet gears 34 are either directly or by means of bushings 38 journalled on the planet pins 39. These pins are inserted in corresponding bores provided in the planet carrier 40 and are connected to the latter. The planet carrier 40 is preferably integral with the hollow shaft 37. The internal gear 36 is connected by screws 43 to the closure member 41 for the transmission casing 24.

One end of the hollow shaft 37 is rotatably journalled in the bearing 44 of the output shaft 3, while the other end of shaft 37 is provided with a splined portion 46 engaging a correspondingly splined portion of the secondary cylinder body 2 similar to the engagement between the splined portion 63 of drive shaft 29 and the correspondingly splined portion of the primary rotor 1.

Between the two shafts 29 and 37 there is provided a pressure spring 47. This spring presses the two rotors 1 and 2 against the control surfaces of control valve or disc 4 to thereby cause a corresponding sealing effect for the period for which the self-sealing to be brought about by the formation of the cylinder bores has not yet become effective. As will be seen from Fig. 1, the pressure spring 47 acts on one hand upon ring 49 mounted in the secondary rotor 2, and on the other hand upon the collar 50 of shaft 29 and upon the snap ring 51.

Figure 4:
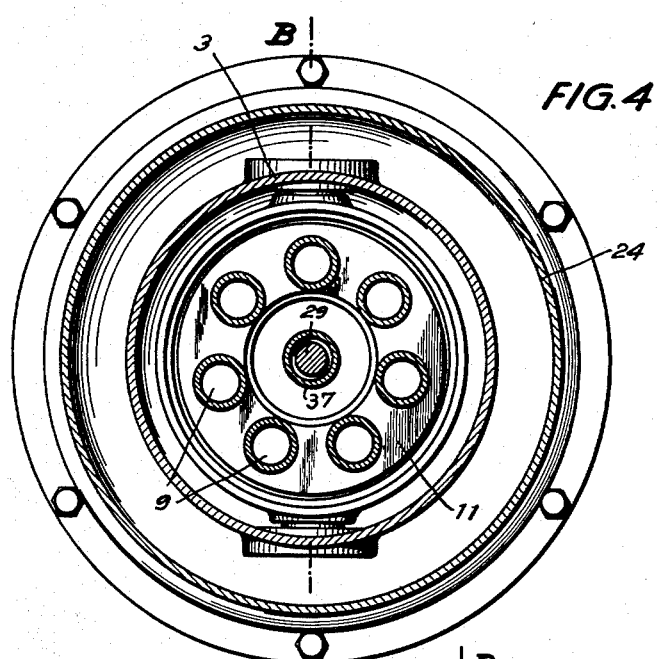
Fig. 4 is a section taken along the line IV—IV of Fig. 1.
Figure 5:
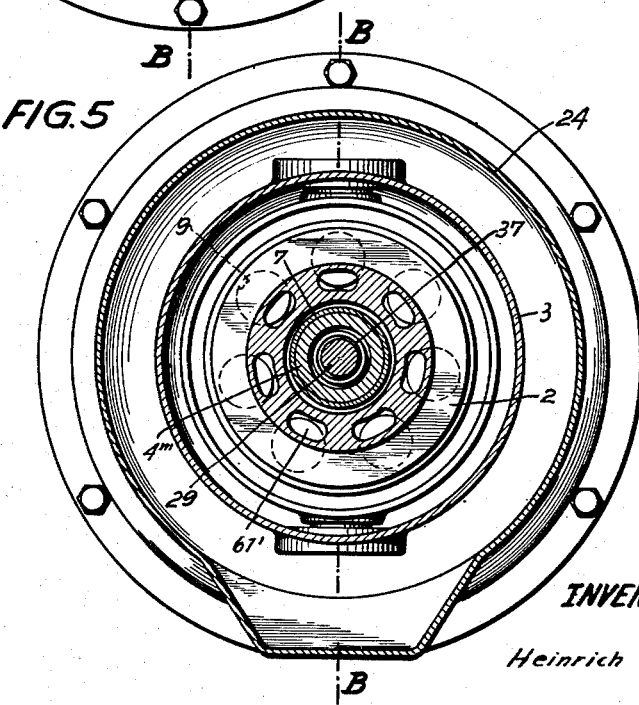
Fig. 5 represents a section taken along the line V—V of Fig. 1.

As will be clear from Fig. 4 in connection with Fig. 1, the particular embodiment shown by way of example in these figures is provided with seven hollow pistons 9 reciprocally mounted in the respective cylinders 61 of the secondary rotor 2 and adapted to act upon the swash plate 11. Provided in said secondary rotor and respectively communicating with said seven cylinders 61 are seven passages 61' as shown in Fig. 5.

Figure 6:
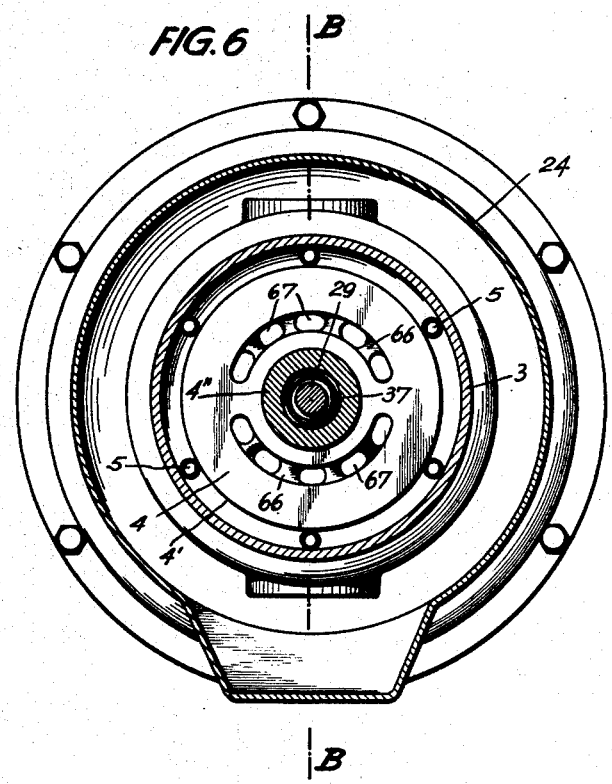
Fig. 6 is a section taken along the line VI—VI of Fig. 1.

As will be seen from Fig. 6, the control disc 4 is provided, in a manner known per se, with kidney shaped control grooves 67 for controlling the rotor 1. These grooves communicate through passages 66 with corresponding control grooves 67' for controlling the rotor 2.

From the above it will be evident that the working fluid may pass from the cylinders 60, in a manner known per se, through the passages 60' in rotor 1, through the control grooves 67, the passages 66, the control grooves 67' and the passages 61' into the cylinders 61 of rotor 2, and vice versa, depending on the angular position of the swivel bodies 18 and 19, which means on the position of the swash plates 10 and 11 and consequently on the respective piston strokes. The ratio between the R. P. M. of the output shaft and the R. P. M. of the input shaft depends on the ratio between the piston strokes, i. e. on the ratio between the angular position of the swivel bodies 10 and 11, based in a manner known per se on the requirement that the volume of working fluid delivered by the rotor 1 must equal the volume of working fluid received by the rotor 2. The liquid volume delivered by the rotor 1, however, equals the difference between the R. P. M. of rotor 1 and the R. P. M. of the output shaft 3 multiplied by the stroke of the pistons 9. The ratio between the R. P. M. of the output shaft and the R. P. M. of the input shaft can thus clearly be calculated from the ratio of the angular positions of the swivel bodies 18 and 19.

Figure 2:
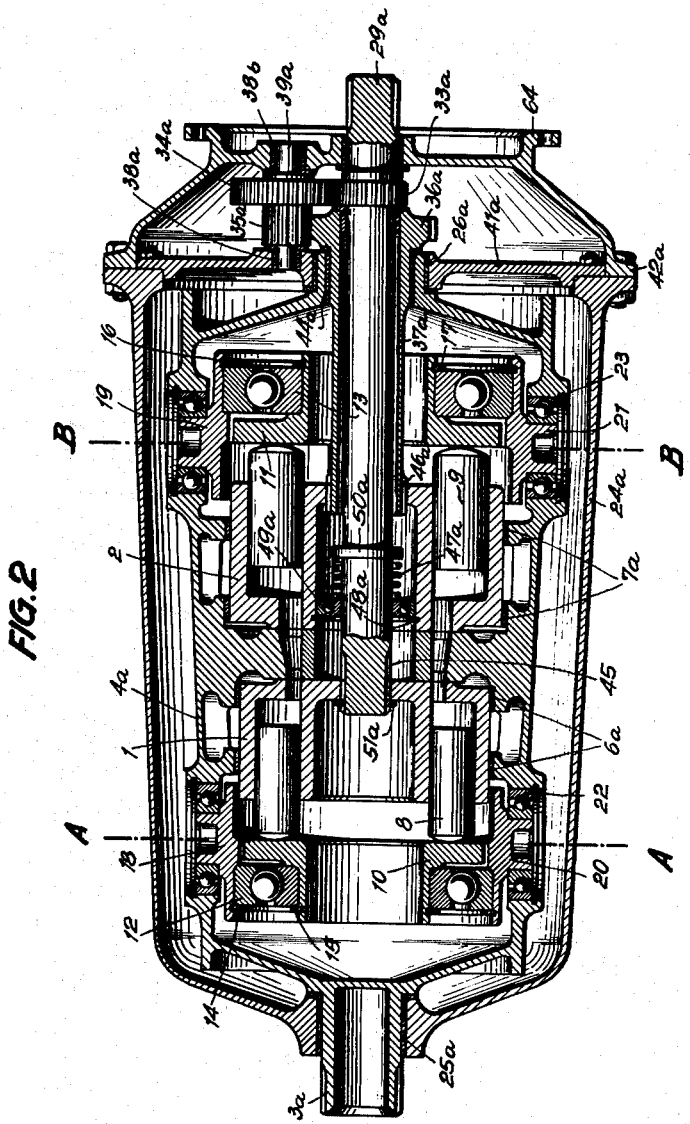
Fig. 2 is a longitudinal section through a modified axial piston fluid transmission according to the present invention.

Referring now to Fig. 2 illustrating an axial piston fluid transmission in which the cylinder bodies or rotors 1 and 2 are also driven at different speeds, it will be seen that the arrangement of Fig. 2 differs from that of Fig. 1 in that the output shaft 3a is integral with the rotatable control valve 4a. The rotors 1 and 2 are journalled in the output shaft 3a by means of the bushings 6a and 7a. The pistons 8 and 9 respectively actuate the swash plates 10 and 11 similar to the corresponding arrangement of Fig. 1. By means of the bearings 12 and 13 and the snap rings 14, 15 and 16, 17, the swash plates 10 and 11 are rotatably secured in the swivel bodies 18 and 19 respectively. The swivel bodies in their turn are provided with studs or pivots 20 and 21 respectively movably or rotatably journalled in the bearings 22 and 23 so as to be able to turn around the axis A—A and B—B respectively. The bearings 22 and 23 are mounted in the hollow output shaft 3a. Depending on the positioning of the swivel bodies 18, 19 in the well known manner, the two rotors 1 and 2 actuate the output shaft 3a and rotate the same at corresponding output speeds in the bearings 25a and 26a provided in the transmission casing 24a.

The primary rotor 1 is driven directly by the drive shaft 29a which extends through the rotor 2. On the other hand, the secondary rotor 2 is driven by the shaft 29a through a spur gear transmission, which comprises the gears 33a, 34a, 35a and 36a, and through the hollow shaft 37a, the angular velocity of the rotor 2 being different from that of rotor 1. The gear 33a is rigidly connected to the drive shaft 29a. The gears 34a and 35a are either integral with or rigidly connected to their axle 39a which latter is journalled in corresponding bearings 38a, 38b, respectively supported by the closure members 41a and 42a of the transmission casing 24a. One end of the hollow shaft 37a is rotatably journalled in a bearing 44a of the output shaft 3a, while the other end of the hollow shaft 37a, similar to the drive shaft 29a, is provided with a splined portion 46a engaging a correspondingly splined portion of the rotor 2.

The pressure spring 47a acts on one hand through bearing 49a and snap ring 48a upon the rotor 2, and on the other hand through the collar 50a of drive shaft 29a and snap ring 51a upon the rotor 1 so as to press both, rotor 1 and rotor 2, against the control surfaces of the rotatable control valve 4a.

The drive shaft 29a and output shaft 3a have their ends provided with splined portions for engaging connecting members (not shown in the drawings). Similarly, the closure member 42a is provided with a flange 64 for connecting the transmission to and centering the same on a drive motor.

Figure 3:
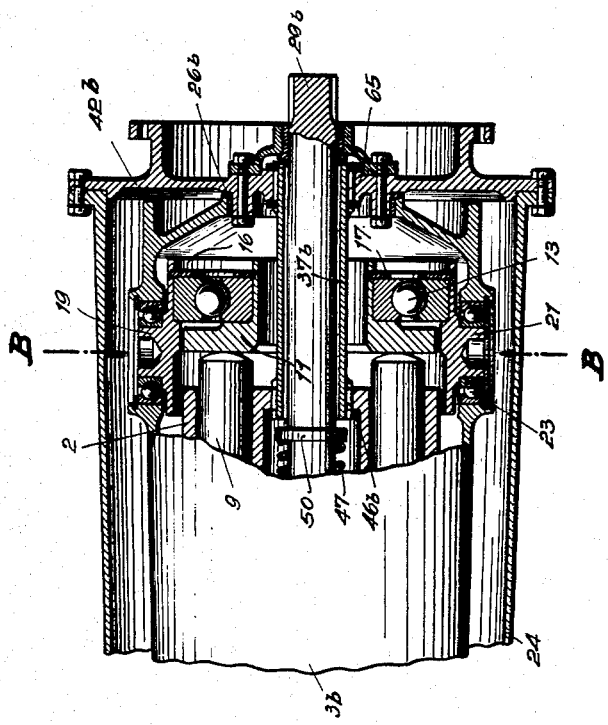
Fig. 3 illustrates a partial section through a portion of a still further modification of a transmission according to the present invention.

Referring now to Fig. 3, the structure shown therein corresponds in principle to that of Figs. 1 and 2. Thus, for instance, the rotor 1 is likewise directly driven by the drive shaft 29b. In contrast to the arrangements of Figs. 1 and 2, however, the cylinder body 2 does not rotate but is arrested or held stationary by the hollow shaft 37b. To this end, for instance, the hollow shaft 37b extends through the bearing 26b of the output shaft 3b and is provided at one end with a splined portion 65 engaging a correspondingly splined portion in the stationary closure member 42b, while a splined portion 46b at the other end of the hollow shaft 37b engages a correspondingly splined portion of the cylinder body 2. Inasmuch as the remaining parts of the structure of Fig. 3 have been described already in connection with Figs. 1 and 2, a further description of Fig. 3 appears to be superfluous.

While, for purposes of simplicity, the hollow output shaft 3, 3a, 3b has been shown as an integral piece, it is to be understood that preferably the hollow output shaft consists of three parts screwed or otherwise connected together along the planes A—A and B—B extending perpendicular to the longitudinal axis of the fluid transmission. This subdivision, however, is by no means necessary, if for instance, the bearings 22 and 23 are inserted into corresponding bores of the swivel bodies 18, 19, and the pivots 20, 21 are inserted from the outside into the output shaft and connected thereto by means of a flange and screws, e. g. in the manner shown at the right hand side of Fig. 7.

Figure 7:
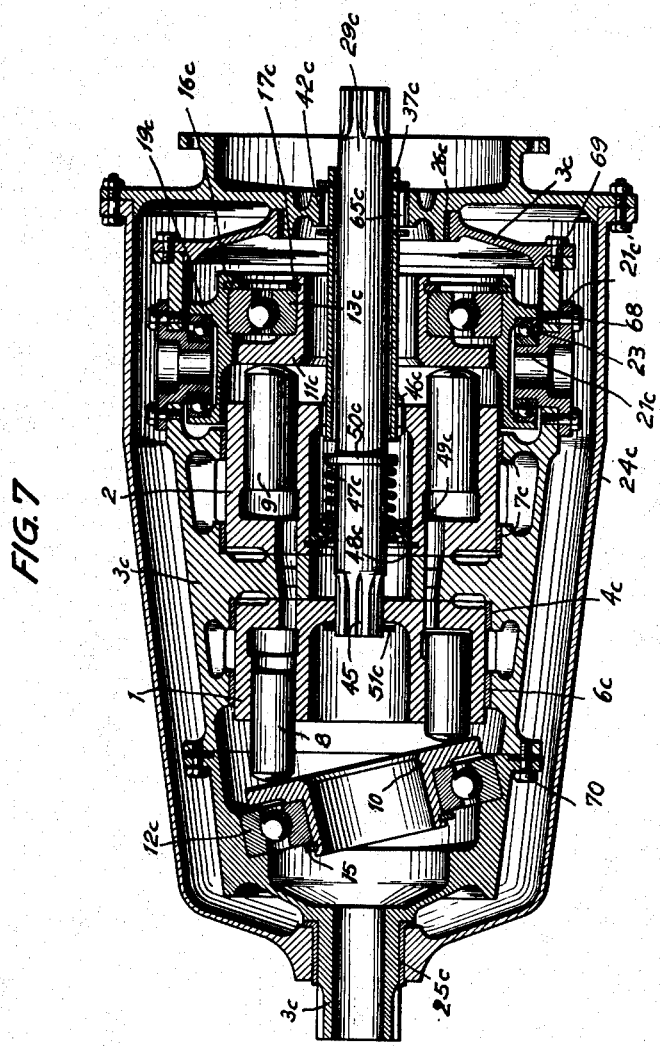
Fig. 7 illustrates a longitudinal section through a further modified transmission according to the invention.

Fig. 7 shows a longitudinal section through a transmission in which the body 2, in a manner similar to that of Fig. 3, is prevented from rotating by the hollow shaft 37c which extends through and has one splined section 65c in engagement with the stationary closure 42c, while a second splined section 46c of shaft 37c is in engagement with the body 2. However, in contrast to Fig. 3, in which the swivel body 19 is provided with two pivots 21, the swivel body 19c of Fig. 7 is so designed that the pivot bearings 23 are inserted into corresponding bores of the swivel body 19c, while the pivots 71 are inserted from the outside through bores in the output shaft 3c and are connected to shaft 3c by means of flange 71a and screws 68 as shown in Fig. 7. Furthermore, in contrast to the arrangements of Figs. 1 to 6, the left hand swash plate 10c in Fig. 7 is not angularly movable but is held in a predetermined inclined position. To this end, the swash plate 10c is supported in its inclined position by the radial-axial bearing 12 mounted in the output shaft 3c which, for this purpose, is provided with a corresponding bore and supporting surface, shown in Fig. 7 turned about an angle of 90° around its longitudinal axis with regard to its actual position, in order more clearly to illustrate the arrangement. For purposes of assembly, the output shaft of the structure of Fig. 7 is likewise composed of three parts, namely 3c, 3d, and 3f which are arranged concentrically with regard to each other and are connected to each other by screws 70 and 69 respectively. All other parts of Fig. 7 correspond to those described in connection with the preceding figures and are, therefore, numbered accordingly, however, with the suffix c.

It will be obvious that the plain bearings shown in the drawings may be replaced by ball bearings, roller bearings or conical antifriction bearings and that, on the other hand, the ball bearings for the swivel bodies as shown in the drawings may be replaced by roller bearings, conical antifriction bearings or plain bearings.

It is, of course, understood that the present invention is, by no means, limited to the particular constructions shown in the drawings but also comprises any modifications within the scope of the appended claims.

What I claim is:

1. An axial piston fluid transmission which comprises in combination, a hollow output shaft, a primary fluid operable cylinder piston arrangement arranged within said output shaft, a secondary fluid operable cylinder piston arrangement mounted within said output shaft, first swash plate means operable by said primary cylinder piston arrangement, second swash plate means operable by said secondary fluid operable cylinder piston arrangement, fluid control means arranged for cooperation with said first and said second cylinder piston arrangements, means drivingly connecting said first and second swash plate means with said output shaft, and drive shaft means extending through an opening in said output shaft and drivingly connected to the cylinder bodies of said primary and said secondary cylinder piston arrangements for rotating said cylinder bodies.

2. An axial piston fluid transmission which comprises in combination, a hollow output shaft, a primary fluid operable cylinder piston arrangement within said output shaft and including a primary cylinder body, a secondary fluid operable cylinder piston arrangement mounted within said output shaft and including a secondary cylinder body, first swash plate means operable by said primary cylinder piston arrangement, second swash plate means operable by said secondary fluid operable cylinder piston arrangement, fluid control means arranged for cooperation with said primary and said secondary cylinder piston arrangements, means drivingly connecting said first and second swash plate means with said output shaft, a drive shaft drivingly connected with said primary cylinder body, and a planetary gear system drivingly interconnecting said drive shaft and said secondary cylinder body for rotating the same.

3. An axial piston fluid transmission which comprises in combination, a hollow output shaft, a primary fluid operable cylinder piston arrangement arranged within said output shaft, said primary cylinder piston arrangement including a primary cylinder body, a secondary fluid operable cylinder piston arrangement mounted within said output shaft and including a secondary cylinder body, first swash plate means operable by said primary cylinder piston arrangement, second swash plate means operable by said secondary fluid operable cylinder piston arrangement, fluid control means arranged for cooperation with said primary and secondary cylinder bodies, a drive shaft directly drivingly connected with said primary cylinder body for rotating the same, and spur gear transmission means drivingly connecting said drive shaft with said secondary cylinder body.

4. An axial piston fluid transmission which comprises in combination, a hollow output shaft, a primary fluid operable cylinder piston arrangement arranged within said output shaft and including a primary cylinder body, a secondary fluid operable cylinder piston arrangement mounted within said output shaft and including a secondary cylinder body, first swash plate means operable by said primary cylinder piston arrangement, second swash plate means operable by said secondary fluid operable cylinder piston arrangement, fluid control means arranged for cooperation with said primary and secondary cylinder bodies, a drive shaft, and reducing transmission means drivingly connecting said drive shaft with one of said cylinder bodies for rotating the same at a speed lower than the speed of said drive shaft.

5. An axial piston fluid transmission which comprises in combination, a hollow output shaft, a primary fluid operable cylinder piston arrangement arranged within said output shaft and including a primary cylinder body, a secondary fluid operable cylinder piston arrangement mounted within said output shaft and including a secondary cylinder body, first swash plate means operable by said primary cylinder piston arrangement, second swash plate means operable by said secondary fluid operable cylinder piston arrangement, fluid control means arranged for cooperation with said primary and secondary cylinder bodies, a drive shaft, and step up transmission means drivingly connecting said drive shaft with one of said cylinder bodies for rotating the same at a speed higher than the speed of said drive shaft.

6. An axial piston fluid transmission which comprises in combination, a hollow output shaft, a primary fluid operable cylinder piston arrangement arranged within said output shaft and including a primary cylinder body, a secondary fluid operable cylinder piston arrangement mounted within said output shaft and including a secondary cylinder body, first swash plate means operable by said primary cylinder piston arrangement, second swash plate means operable by said secondary fluid operable cylinder piston arrangement, rotatable fluid control valve means common to said primary and said secondary cylinder bodies for cooperation therewith, a single spring means arranged to press both, said primary and said secondary cylinder body against opposite surfaces of said common fluid control valve means, means drivingly connecting said first and second swash plate means with said output shaft, and a drive shaft drivingly connected with the cylinder body of both of said cylinder piston arrangements.

7. An axial piston fluid transmission, which comprises in combination: a hollow output shaft, a primary cylinder body rotatably mounted within said hollow output shaft, primary piston means reciprocably mounted in said primary cylinder body, a secondary cylinder body rotatably mounted within said hollow output shaft, secondary piston means reciprocably mounted in said secondary cylinder body, a drive shaft drivingly connected to one of said cylinder bodies to cause said one cylinder body to rotate at the same speed as said drive shaft, transmission means drivingly connected to said drive shaft and to the other cylinder body for conveying driving power from said drive shaft also to said other cylinder body but so as to drive the latter at a speed different from the speed of said drive shaft, first swash plate means arranged for cooperation with said primary piston means, second swash plate means arranged for cooperation with said secondary piston means, and means respectively drivingly connecting said first and second swash plate means to said hollow output shaft and adapted to convey driving power from both of said cylinder bodies and piston means through the swash plates pertaining thereto to said output shaft.

8. An axial piston fluid transmission which comprises in combination: a hollow output shaft, a primary cylinder body rotatably mounted within said hollow output shaft, primary piston means reciprocably mounted in said primary cylinder body, a secondary cylinder body rotatably mounted within said hollow output shaft, secondary piston means reciprocably mounted in said secondary cylinder body, first swash plate means arranged for cooperation with said primary piston means, second swash plate means arranged for cooperation with said secondary piston means, a first driving shaft extending through an opening in said hollow output shaft and being directly drivingly connected to one of said cylinder bodies to cause said one cylinder body to rotate at the same speed as said first driving shaft, and a second driving shaft coaxially arranged with said first driving shaft and drivingly connected to both said first driving shaft and the other one of said cylinder bodies.

References Cited in the file of this patent

UNITED STATES PATENTS

| Number | Name | Date |
| --- | --- | --- |
| 1,197,789 | Bluemel | Sept. 12, 1916 |
| 1,648,000 | Lee | Nov. 8, 1927 |
| 2,141,166 | Bischof | Dec. 27, 1938 |
| 2,354,597 | Jandasek | July 25, 1944 |
| 2,432,115 | Mayner | Dec. 9, 1947 |

FOREIGN PATENTS

| Number | Country | Date |
| --- | --- | --- |
| 23,390 | Australia | July 6, 1935 |